(12) United States Patent
Naramoto et al.

(10) Patent No.: US 6,296,698 B1
(45) Date of Patent: Oct. 2, 2001

(54) CEMENT ADMIXTURE AND CEMENT COMPOSITION

(75) Inventors: Satoru Naramoto; Masahiro Hayashi, both of Kanagawa; Kazuhiko Hiromoto, Tokyo, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/385,138

(22) Filed: Aug. 30, 1999

Related U.S. Application Data

(60) Provisional application No. 60/136,028, filed on May 25, 1999.

(51) Int. Cl.$^7$ .......................... C04B 24/26; C08F 226/02; C08F 290/14; C08F 220/06
(52) U.S. Cl. .......................... 106/808; 106/725; 106/727; 106/823; 524/5
(58) Field of Search ................................ 106/727, 808, 106/725, 823; 524/5

(56) References Cited

FOREIGN PATENT DOCUMENTS

| | | |
|---|---|---|
| 0757 998 A2 | 2/1997 | (EP) . |
| 0 838 444 A1 | 4/1998 | (EP) . |
| H05-238795 | 9/1993 | (JP) . |
| H06-206752 | 7/1994 | (JP) . |
| H08-225354 | 9/1996 | (JP) . |
| H09-002856 | 1/1997 | (JP) . |
| H09-132444 | 5/1997 | (JP) . |
| H10-053627 | 2/1998 | (JP) . |

*Primary Examiner*—Anthony Green
(74) *Attorney, Agent, or Firm*—Sughrue, Mion, Zinn, Macpeak & Seas, PLLC

(57) ABSTRACT

A cement admixture that includes a copolymer obtained by polymerizing (A) 10 to 85% by weight of N-vinylacetamide or a monomer derived therefrom, (B) 10 to 90% by weight of an (alkoxy)polyethylene glycol (meth)acrylate or (alkoxy)polyethylene glycol (meth)allyl ether monomer, (C) 5 to 50% by weight of a vinyl monomer containing one carboxylic acid group, at least one sulfonic acid group or salt thereof in a molecule, and (D) 0 to 40% by weight of a vinyl monomer other than (A), (B) and (C), provided that the sum of monomers (A), (B), (C) and (D) is 100% by weight. The cement admixture by itself can impart a cement composition with flowability, flowability maintenance ability, packing property and resistance to segregation in good balance, and is effective in improvement of workability, operability, and quality of hardened article.

24 Claims, 1 Drawing Sheet

CEMENT ADMIXTURE AND CEMENT COMPOSITION

CROSS REFERENCE TO RELATED APPLICATION

This application is an application filed under 35 U.S.C. section 111(a) claiming benefit pursuant to 35 U.S.C. section 119(e)(i) of the filing date of the Provisional Application No. 60/136,028, filed May 25, 1999, pursuant to 35 U.S.C. section 111(b).

TECHNICAL FIELD

The present invention relates to a cement admixture and to a cement composition. More particularly, it relates to a cement admixture that is added to a cement composition such as concrete, mortar, cement paste, etc. to improve the flowability, flowability retaining ability, and packing property and further impart the composition with resistance to segregation of the components and to a cement composition which is blended with such a cement admixture, which is easy to execute and operate and which gives a hardened product having an improved quality.

BACKGROUND ART

Recently, on operation spots where concrete is used, such as civil engineering spots or construction spots, vibration compaction operation is used which generates noises and hence there has been an increasing demand for concrete that requires no compaction operation in order to reduce noises and decrease work load on the spot as well. Furthermore, with increasing complexity and functionality of constructions, it is necessary to pack concrete uniformly into inside the frames where reinforcements are densely distributed. In this regard, extensive studies have been made on the development of concrete that has flowability, flowability retaining ability, high packing property, and resistance to segregation and needs no compaction operation.

Generally, a cement dispersant is added to concrete in order to improve the flowability, flowability retaining ability and packing property thereof. Such a cement dispersant includes various substances, e.g., melaminesulfonic acid formaldehyde salts, naphthalenesulfonic acid formaldehyde salts, polycarboxylic acid salts, etc.

However, these cement dispersants when added to concrete can impart flowability and flowability retaining ability to concrete due to their high dispersing effect but cause the phenomenon that concrete loses uniformity during its flow and the components of aggregate will separate, thereby deteriorating the feasibility of concrete. Furthermore, after hardening, the concrete has an inferior quality (see, for example, JP-A-5-238795 (the term "JP-A" as used herein means an "unexamined published Japanese patent application), and JP-A-5-298795, JP-A-6-225354 (U.S. Pat. No. 5,362,829)).

With view to inhibiting or suppressing the segregation, there has been studied addition of water-soluble polymers, for example, cellulose derivatives such as methyl cellulose ether, synthetic polymers such as polyacrylamide, natural polysaccharides such as cardlan as a segregation reducing agent to concrete (see, for example, JP-A-6-206752, JP-A-9-132444, and JP-A-9-2856). However, the water-soluble polymers as a segregation reducing agent have the problem that addition in an amount sufficient to inhibit the segregation results in an increase in viscosity of concrete and the flowability and flowability retaining ability of concrete are decreased.

As a segregation reducing agent that does not deteriorate the flowability and flowability retaining ability of concrete even in a concentration sufficient to suppress the segregation, there has been proposed in JP-A-10-53627 copolymers containing a N-vinylcarboxamide monomer. However, to impart concrete with flowability, flowability retaining ability, high packing property and resistance to segregation, it is necessary to add to concrete the above-mentioned cement dispersant and a segregation reducing agent consisting of copolymer containing a N-vinylcarboxamide monomer in combination.

As described above, in the prior art, it has been impossible to impart concrete with flowability, flowability retaining ability, high packing property, and resistance to segregation which are required for concrete by means of a single agent of copolymer in good balance.

PROBLEM WHICH THE INVENTION IS TO SOLVE

Therefore, an object of the present invention is to provide a cement admixture that can achieve two functions, i.e., the function of a dispersant which imparts a cement composition with improved flowability, flowability retaining ability, and packing property and the segregation inhibiting or suppressing function which imparts a cement composition with resistance to segregation of the components thereof, in the form of a single agent of copolymer.

Another object of the present invention is to provide a cement composition containing the cement admixture and having flowability, flowability retaining ability, high packing property, and resistance to segregation in good balance.

The present inventors have made extensive research with view to achieve the above-described object, and as a result the present invention has been completed.

That is, the present invention relates to the following cement admixture and to a cement composition.

[1] A cement admixture comprising a copolymer obtainable by polymerizing a monomer mixture consisting of:
(A) 2 to 85% by weight of a monomer represented by general formula (1)

(wherein, $R^1$ and $R^2$, which is the same or different, each represent a hydrogen atom or a methyl group),
(B) 90 to 10% by weight of one or more monomers represented by general formula (2)

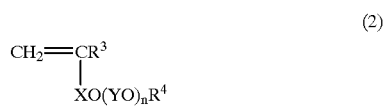

(wherein $R^3$ represents a hydrogen atom or a methyl group, X represents $-C(=O)-$ or $-CH_2-$, Y represents an alkylene group having 2 to 4 carbon atoms, $R^4$ represents a hydrogen atom or an alkyl group having 1 to 5 carbon atoms, and n is an integer of from 2 to 100), and
(C) 5 to 50% by weight of an anionic vinyl monomer, wherein the sum of the monomers (A), (B) and (C) is 100% by weight.

[2] A cement admixture comprising a copolymer obtainable by polymerizing a monomer mixture consisting of:
(A) 2 to 85% by weight of a monomer represented by general formula (1)

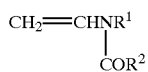
(1)

(wherein, $R^1$ and $R^2$, which is the same or different, each represent a hydrogen atom or a methyl group),
(B) 90 to 10% by weight of one or more monomers represented by general formula (2)

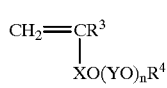
(2)

wherein $R^3$ represents a hydrogen atom or a methyl group, X represents —C(=O)— or —CH$_2$—, Y represents an alkylene group having 2 to 4 carbon atoms, $R^4$ represents a hydrogen atom or an alkyl group having 1 to 5 carbon atoms, and n is an integer of from 2 to 100),
(C) 5 to 50% by weight of an anionic vinyl monomer, and
(D) 0 to 40% by weight of a vinyl monomer other than the monomers (A), (B) and (c),
wherein the sum of the monomers (A), (B), (C) and (D) is 100% by weight.
[3] The cement admixture as described in [1] or [2], wherein the monomer (A) represented by the general formula (1) is N-vinylacetamide.
[4] The cement admixture as described in [1] or [2], wherein the monomer (B) represented by the general formula (2) is one in which n is an integer of from 4 to 50.
[5] The cement admixture as described in [1] or [2], wherein the monomer (B) represented by the general formula (2) is one in which n is an integer of from 4 to 25, X is —C(=O)—, Y is —CH$_2$—CH$_2$—O—, and $R^4$ is a methyl group.
[6] The cement admixture as described in [1] or [2], wherein the anionic vinyl monomer (C) is one or more compounds selected from the group consisting of (meth)acrylic acid, maleic acid, fumaric acid, itaconic acid, (meth)allylsulfonic acid, and salts thereof.
[7] The cement admixture as described in [6], wherein the anionic vinyl monomer (C) is (meth)acrylic acid or maleic acid.
[8] The cement admixture as described in [1] or [2], wherein the vinyl monomer (D) is one or more compounds selected from the group consisting of methyl (meth)acrylate, ethyl (meth)acrylate, 2-hydroxyethyl (meth)acrylate, 2-hydroxypropyl (meth)acrylate, and (meth)acrylonitrile.
[9] A cement composition containing a cement admixture imparted with resistance to segregation as claimed in any one of the above items [1] to [8].
[10] The cement composition as described in [9], wherein the cement admixture imparted with resistance to segregation is contained in a solids content of 0.1 to 2.0% by weight based on a cement and a hydraulic substance.

DESCRIPTION OF EMBODIMENTS

Figure 1:
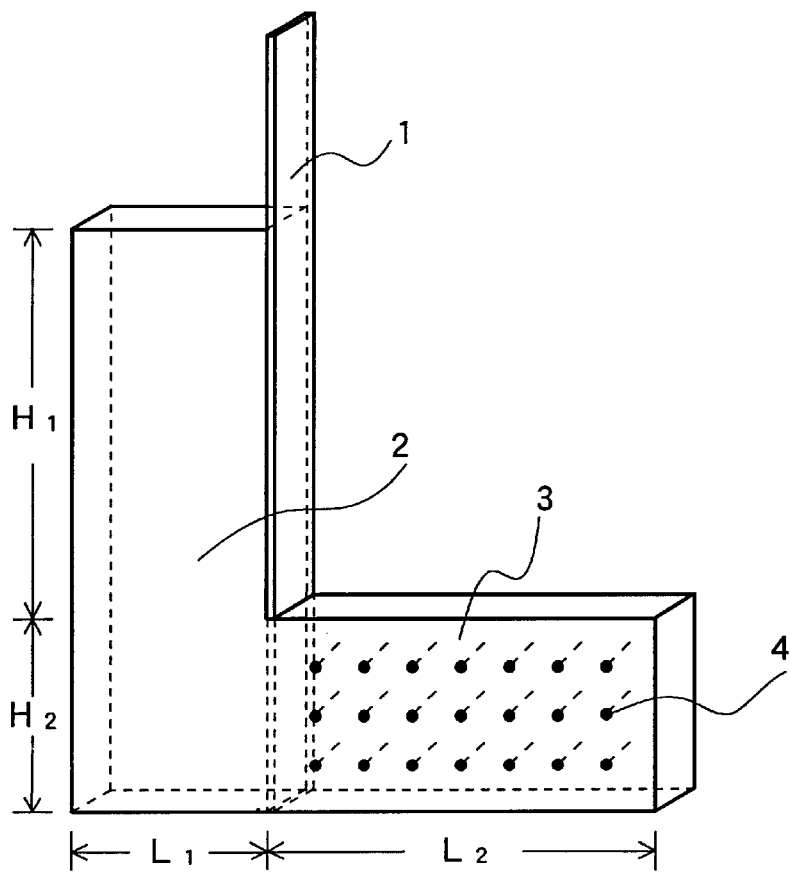
FIG. 1 is a perspective view showing an L-type testing apparatus used for self packing test of concrete.

Hereafter, the present invention will be described taking an example of concrete, which is a representative example of cement composition in which the cement admixture of the present invention having both segregation inhibiting function and dispersing function is used.

The monomer represented by the general formula (1) used in the cement admixture of the present invention includes N-vinylformamide, N-vinylacetamide, N-methyl-N-vinylformamide, N-methyl-N-vinylacetamide, etc., with N-vinylacetamide being preferred.

In the copolymer used in the cement admixture of the present invention, the monomer (A) is in an amount of from 2 to 85% by weight, preferably from 5 to 50% by weight, based on the total monomers. If the monomer (A) is present in an amount above 85% by weight, it is difficult to impart fresh concrete with sufficient flowability and flowability retaining ability whereas with below 2% by weight of the monomer (A), it tends to be difficult to impart fresh concrete with sufficient resistance to the segregation.

The monomer (B) represented by the general formula (2) used in the present invention includes, for example, esters of polyethylene glycol, methoxypolyethylene glycol, ethoxypolyethylene glycol, polypropylene glycol, polybutylene glycol, methoxypolypropylene glycol, ethoxypolypropylene glycol, etc. (n is from 2 to 100) with (meth)acrylic acid or etherified products of these glycols with (meth)allylalcohols. The number "n" in these compounds is preferably from 4 to 50. Particularly preferred are those in which X is —C(=O)—, Y is —CH$_2$—CH$_2$—O—, and $R^1$ is a methyl group. (Here, "(meth)acryl" means methacryl or acryl and "(meth)allyl" means methallyl or allyl.)

The monomer (B) in the total monomers of the copolymer used in the cement admixture of the present invention is in an amount of from 90 to 10% by weight, preferably from 70 to 40% by weight. If the amount is above 90% by weight, it tends to be difficult to impart the cement composition with sufficient resistance to segregation while if it is below 10% by weight, it is difficult to impart fresh concrete with sufficient flowability and flowability retaining ability.

The anionic vinyl monomer (C) used in the present invention includes, for example, unsaturated monocarboxylic acids such as (meth)acrylic acid, salts thereof, unsaturated dicarboxylic acids such as maleic acid, fumaric acid, and itaconic acid, salts or acid anhydrides thereof, unsaturated sulfonic acids such as (meth)allylsulfonic acid and styrenesulfonic acid or salts thereof. (Meth)acrylic acid and maleic acid are preferred.

In the copolymer used in the cement admixture of the present invention, the monomer (C) is in an amount of from 5 to 50% by weight, preferably from 10 to 40% by weight, based on the total weight of the monomers. If the amount of the monomer (C) is above 50% by weight, it tends to be difficult to impart fresh concrete with sufficient resistance to the segregation while it is below 5% by weight, it is difficult to impart fresh concrete with sufficient flowability and flowability retaining ability.

The vinyl monomer (D) used in the present invention may be any vinyl monomer other than the monomer (A), monomer (B), and anionic vinyl monomer (C). There can be cited, for example, nonionic monomers such as methyl (meth)acrylate, ethyl (meth)acrylate, propyl (meth)acrylate, 2-hydroxyethyl (meth)acrylate, 2-hydroxypropyl (meth)acrylate, (meth)acrylamide, N,N-dimethyl(meth)acrylamide, N-isopropylacrylamide, diacetoneacrylamide, N-methylol-acrylamide, acryloylmorpholine, N-vinylpyrrolidone, (meth)acrylonitrile, styrene, α-methylstyrene, p-methylstyrene, styrene dimer, vinyl acetate, methyl vinyl ketone, ethyl vinyl ketone, methyl vinyl ether, ethyl vinyl ether, isobutylene, 4-methylpentene-1, norbornene, allyl alcohol, and allyl chloride, cationic monomers such as N,N-dimethylaminoethyl acrylate and N,N-dimethylaminopropyl-acrylamide or quaternary ammonium salts thereof. Methyl (meth)acrylate, ethyl (meth)acrylate, 2-hydroxyethyl (meth)acrylate, 2-hydroxypropyl (meth)acrylate and (meth)acrylonitrile are preferred.

In the present invention, the vinyl monomer (D) may be used or does not have to be used. When it is used, its amount should not exceed 40% by weight. Preferably it is used in an amount of 30% by weight or less. If its amount exceeds 40% by weight, the cement admixture does not exhibit its properties sufficiently.

The production method for the copolymers used in the present invention is not limited particularly but water solution polymerization, reverse phase suspension polymerization, precipitation deposition polymerization and the like method can be used. Usually, polymerization initiators are used. As the polymerization initiator, there can be used common radical initiators, for example, azo initiators such as 2,2'-azobisisobutyronitrile, 2,2'-azobis(2-amidinopropane) dihydrochloride, 2,2'-azobis[2-(2-imidazolin-2-yl)propane] dihydrochloride, 2,2'-azobis[2-(3,4,5,6-tetrahydropyrimidin-2-yl)propane]dihydrochloride and 2,2'-azobis[2-(5-hyroxy-3,4,5,6-tetrahydropyrimidin-2-yl)propane]dihydrochloride, peroxides such as hydrogen peroxide, benzoyl peroxide, t-butyl hydroperoxide, and succinic acid peroxide, persulfates such as ammonium persulfate and potassium persulfate, so-called redox initiators in which a peroxide or persulfate and a reducing agent such as triethanolamine, sodium sulfite or sodium thiosulfate coexist in the same system, etc. Furthermore, chain transfer agent may be used as a controlling agent for molecular weight upon polymerization. The chain transfer agent includes n-butyl mercaptan, triethylamine, isopropyl alcohol, ammonium thioglycolate, sodium hypophosphite, etc.

The weight average molecular weight of the copolymers of the present invention (values obtained by measurement by gel permeation chromatography using pullulan as a standard substance) may vary depending on blending conditions, use conditions and requirements for cement compositions but usually a range of from 5,000 to 300,000 is preferred. If the weight average molecular weight is 5,000 or less, the resistance to segregation is imparted insufficiently while if it exceeds 300,000, there is the tendency that dispersibility decreases and hence the flowability, flowability retaining ability and packing property become insufficient.

In the present invention, it is usually preferred that the amount of the cement admixture be from 0.1 to 2.0% by weight based on the cement and hydraulic substance.

The cement admixture of the present invention is used in hydraulic composition such as cements for use in civil engineering, construction, secondary products, ceramic construction articles and its use is not limited particularly.

To adjust flowability and flowability retaining ability, the cement admixture of the present invention can be used together with other cement dispersants which are commonly used, such as water-reducing agent, AE (Air Entrained) water-reducing agent, high performance water-reducing agent, fluidizing agent, and high performance AE water-reducing agent. Further, to adjust resistance to segregation, the cement admixture of the present invention may be used together with a segregation reducing agent such as methyl cellulose, natural polysaccharides, and polyacrylamides. Furthermore, other admixture (materials), for example, retarding agents, high-early-strength agents, accelerators, foaming agents, water retaining agent, water-proofing agent, defoaming agents, surfactants, expanding agents (materials), blast furnace slug, fly ash, silica fume, asbestos, vinylon fibers, PP fibers, etc.

BEST MODE FOR CARRYING OUT THE INVENTION

Hereafter, the present invention will be described in greater detail by examples. However, the present invention is not limited to thereto.

PRODUCTION EXAMPLE 1

Production of Copolymer

In a glass reactor equipped with a stirrer were charged 90 g of N-vinylacetamide, 120 g of methoxypolyethylene glycol methacrylate (mole number of ethylene glycol unit added was 9, hereafter, referred to as "9EG-MA"), and 90 g of methacrylic acid and the mixture was dissolved by addition of 530 g of water. Then, 140 g of an aqueous 40% sodium hydroxide solution and pH of the reaction system was adjusted to 9.0. The reaction mixture was kept at 60° C. in an incubator with stirring and the dissolved oxygen was removed by flowing nitrogen therein. Thereafter, 30 g of an aqueous 25% ammonium persulfate (APS) solution was added and the resulting mixture was allowed to react for 5 hours under nitrogen flow to complete the polymerization. The weight average molecular weight of the resultant copolymer (hereafter, abbreviated as S1) was measured by gel permeation chromatography using pullulan as a standard substance (hereafter, weight average molecular weights were measured similarly) and as a result it revealed to be 28,000.

PRODUCTION EXAMPLES 2 TO 11

Production of Copolymers

The method of Production Example 1 was repeated except that the kind of monomers, proportion of monomers, and the addition amounts of aqueous 25% ammonium persulfate were changed to obtain copolymers (S2 to S11).

The specific conditions and weight average molecular weights are shown in Table 1 together with the particulars of S1.

TABLE 1

| Copolymer | A NVA | B 9EG-MA | B 23EG-MA | C MAA | C AA | C MS | D AN | D MA | 25%-APSaq (g) | Weight Average Molecular Weight |
|---|---|---|---|---|---|---|---|---|---|---|
| S1 | 90 | 120 | | 90 | | | | | 30 | 28000 |
| S2 | 30 | 180 | | 90 | | | | | 30 | 29000 |
| S3 | 120 | 90 | | 90 | | | | | 30 | 22000 |
| S4 | 90 | 120 | | 90 | | | | | 24 | 41000 |
| S5 | 90 | 120 | | 90 | | | | | 42 | 11000 |
| S6 | 90 | 150 | | 60 | | | | | 30 | 30000 |
| S7 | 90 | | 120 | 90 | | | | | 42 | 31000 |
| S8 | 90 | 120 | | | 90 | | | | 36 | 28000 |
| S9 | 90 | 105 | | 90 | | | | 15 | 30 | 20000 |
| S10 | 90 | 105 | | 90 | | | 15 | 30 | | 19000 |
| S11 | 90 | 105 | | 60 | | 30 | | 15 | 24 | 22000 |

*Symbols in the above table have the following meanings.
NVA: N-vinylacetamide
9EG-MA: Methoxypolyethylene glycol methacrylate (Mole number of ethylene glycol added: 9)
23EG-MA: Methoxypolyethylene glycol methacrylate (Mole number of ethylene glycol added: 23)
MAA: Methacrylic acid
AA: Acrylic acid
MS: Sodium methallylsulfonate
AN: Acrylonitrile
MA: Methyl acrylate
APS: Ammonium persulfate

Comparative Production Example 1
Production of Copolymer

In a glass reactor equipped with a stirrer were charged 90 g of methyl acrylate (MA), 120 g of methoxypolyethylene glycol methacrylate (9EG-MA), and 90 g of methacrylic acid (MAA) and the mixture was dissolved by addition of 542 g of water. Then, 140 g of an aqueous 40% sodium hydroxide solution and pH of the reaction system was adjusted to 9.0. The reaction mixture was kept at 60° C. in an incubator with stirring and the dissolved oxygen was removed by flowing nitrogen therein. Thereafter, 18 g of an aqueous 25% ammonium persulfate (APS) solution was added and the resulting mixture was allowed to react for 5 hours under nitrogen flow to complete the polymerization. The weight average molecular weight of the resultant copolymer (hereafter, abbreviated as R1) was 29,000.

Comparative Production Examples 2 to 8
Production of Copolymers

The method of Comparative Production Example 1 was repeated except that the kind of monomers, proportion of monomers, and the addition amounts of aqueous 25% ammonium persulfate were changed to obtain copolymers (R2 to R8).

The specific conditions and weight average molecular weights are shown in Table 2 together with the particulars of R1.

TABLE 2

| Copolymer | A NVA | B 9EG-MA | B 23EG-MA | C MAA | C AA | C MS | D AN | D MA | 25%-APSaq (g) | Weight Average Molecular Weight |
|---|---|---|---|---|---|---|---|---|---|---|
| R1 | — | 120 | | 90 | | | | 90 | 18 | 29000 |
| R2 | — | 180 | | 90 | | | | 30 | 18 | 33000 |
| R3 | — | 210 | | 90 | | | | | 24 | 31000 |
| R4 | — | | 120 | 90 | | | | 90 | 24 | 31000 |
| R5 | — | | 210 | 90 | | | | | 40 | 29000 |
| R6 | — | 120 | | | 90 | | | 90 | 24 | 26000 |
| R7 | — | 120 | | 90 | | | 30 | 60 | 18 | 20000 |
| R8 | — | 120 | | 60 | | 30 | | 90 | 18 | 18000 |

*In Table 2, 9EG-MA, 23EG-MA, MAA, AA, MS, AN, MA, and 25% APS have the same meanings as in Table 1.

Test Example
(1) Performance Evaluation Test-1 for cement admixture

To know of the performance of the copolymers synthesized in Production Examples as a cement admixture, each of the copolymers obtained in the Production Examples and Comparative Production Examples was added to concrete upon its preparation and performance evaluation tests on flowability, self-packing property, and resistance to segregation were performed.

Furthermore, similar evaluation tests were performed on samples containing commercially available high performance AE water reducing agents (SP1, SP2) alone as a cement admixture and samples containing SP1 or SP2 together with methyl cellulose as a segregation reducing agent and these were added as comparative examples. Note that the following were used as SP1 and SP2.

SP1: Polycarboxylic acid high performance AE (Air Entrained) water reducing agent SP2: Aromatic aminosulfonic acid high performance AE (Air Entrained) water reducing agent (1-1) Concrete Ingredients Proportion and Kneading Method (i) Concrete Material Formulation The ingredients proportion of concrete used in the performance test is shown in Table 3.

TABLE 3

| Concrete Material Formulation | | | | | |
|---|---|---|---|---|---|
| W/C | S/a | Unit Amount (kg/m$^3$) | | | |
| (%) | (%) | W[1] | C[2] | S[3] | G[4] |
| 50.0 | 53.0 | 180 | 360 | 915 | 810 |

[1]Water (W): City water
[2]Cement (C): Normal Portland cement (specific gravity: 3.16)
[3]Fine aggregate (S): Fuji River sand (specific gravity: 2.60, coarse grain ratio: 2.65)
[4]Coarse aggregate (G): Crushed stone produced in Ohme (specific gravity: 2.65, coarse grain ratio: 6.85)
*a = S + G (ii) Mixing Method Raw materials of powder, i.e., cement (C), fine aggregate (S) and coarse aggregate (G), were charged in a 50-L pan type mixer in respective predetermined amounts and stirred for 30 seconds. Thereafter, water (W) and a cement admixture were added and the stirring was continued for additional 120 seconds. After confirming that the mixing was sufficient, the contents were taken out and subjected to tests.

In the test on samples containing methyl cellulose in combination, methyl cellulose was added at the time of charging the cement (C), fine aggregate (S) and coarse aggregate (G).

(1-2) Performance Test Method (i) Flowability Test

Slump Flow Test: In accordance with the US standard ANSI/ASTM C 143-78 (Standard Test for Slump of Portland Cement Concrete), a slump cone (inner diameter of upper end: 10 cm, inner diameter of lower end: 20 cm, height: 30 cm) placed on a water-tight plate was packed with concrete and the slump cone was gently drawn up vertically and the diameter (cm) of the concrete that spread over the flat plate was measured. This test was performed on the slump cone immediately after the packing, and after 60 minutes and after 120 minutes, respectively, after the packing.

(ii) Self-packing Test

Figure 2:
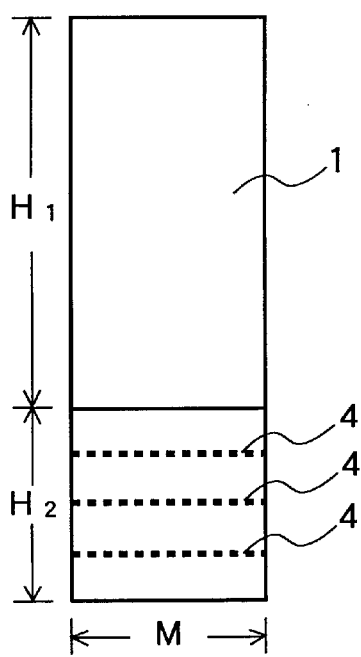
FIG. 2 is a front view showing a L-type testing apparatus for self packing test of concrete.

The height of concrete was measured using the L-type test apparatus shown in FIG. 1 (perspective view) and FIG. 2 (front view), by arranging a partition plate (1) in a closed state and filling concrete in a left-side chamber (2) defined by the partition plate (1), rendering the partition plate (1) full open to allow concrete to flow into a right-side chamber (3) provided with 13 mmφ reinforcement (4) (at a vertical distance of 50 mm), and measuring the height of the flown concrete. The height $H_1$ was, 400 mm, $H_2$ was 200 mm, $L_1$ was 200 mm, $L_2$ was 400 mm, width M was 200 mm. Therefore, it is considered that the higher the packed concrete (the closer to 200 mm) was, the better the self-packing property can be ensured.

(iii) Test on Resistance to Segregation of Components

"Fine aggregate washing test" described in "High Flowability Concrete, Its Material, Preparation, Production, Practice Guideline (Draft) and Commentary" edited by Japan Construction Association was performed.

More specifically, about 2 kg each of fresh concrete after the slump flow test was completed was collected from a central part and peripheral part and wet screened with a 5-mm mesh sieve. The weight of the residual aggregate was measured and the ratio of the coarse aggregate weight ratio of the central part to the coarse aggregate weight ratio of the peripheral part was obtained as an inner-to-outer coarse aggregate ratio.

Therefore, the closer the inner-to-outer coarse aggregate ratio is to 1, the lesser the difference in coarse aggregate between the central part and peripheral part is so that the material is judged to show a good resistance to segregation of materials.

(iv) Others

Air amount: According to JIS-A1128, in a cylindrical vessel having a flange, provided on its upper part with an air chamber through a valve (about 5% by volume of the vessel) equipped with a pressure gauge, was uniformly filled with concrete and the surface of the concrete was flattened. Thereafter, the flange was tightened and high pressure air at a predetermined pressure was filled in the chamber, followed by opening the valve and measuring the degree of decrease in pressure in the air chamber. According to a calibration curve prepared in advance, air amount (%) was obtained.

Compressive strength (kg/cm$^2$): According to the US standard, ANSI/ASTM C 39-72 (Standard Test for Compressive Strength of Cylindrical Concrete Specimens), measurements were made on the specimens aged 7 days and 28 days, respectively.

(1-3) Performance Test Results

Performance test results obtained are shown in Table 4.

TABLE 4-1

| Ex. No. | Cement Admixture Name | Amount (wt %)* | Amount of Air (%) | Slump Flow (cm) Immediately After | After 60 min. | After 120 min. | Self Packing Property (Packing Height) (cm) | Resistance to Segregation (Inner-to-Outer ratio) (cm) | Comprehensive Strength (kg/cm$^2$) Age 7 days | Age 28 days |
|---|---|---|---|---|---|---|---|---|---|---|
| 1 | S1 | 0.25 | 3.6 | 58.0 | 55.5 | 54.0 | 12.5 | 1.16 | 306 | 395 |
| 2 | S1 | 0.5 | 4.4 | 62.0 | 61.0 | 61.0 | 15.0 | 1.07 | 335 | 427 |
| 3 | S1 | 0.75 | 4.9 | 63.5 | 63.5 | 64.0 | 17.5 | 1.08 | 339 | 438 |
| 4 | S2 | 0.25 | 4.0 | 60.0 | 59.5 | 58.0 | 13.5 | 1.18 | 300 | 387 |

TABLE 4-1-continued

| | Cement Admixture | | Amount of Air (%) | Slump Flow (cm) | | | Self Packing Property (Packing Height) (cm) | Resistance to Segregation (Inner-to-Outer ratio) (cm) | Comprehensive Strength (kg/cm²) | |
|---|---|---|---|---|---|---|---|---|---|---|
| Ex. No. | Name | Amount (wt %)* | | Immediately After | After 60 min. | After 120 min. | | | Age 7 days | Age 28 days |
| 5  | S2  | 0.5  | 4.5 | 62.5 | 63.0 | 61.0 | 16.5 | 1.09 | 328 | 429 |
| 6  | S2  | 0.75 | 4.9 | 63.5 | 64.5 | 63.5 | 18.0 | 1.06 | 331 | 440 |
| 7  | S3  | 0.5  | 4.4 | 61.5 | 60.5 | 60.0 | 14.5 | 1.02 | 345 | 441 |
| 8  | S4  | 0.5  | 4.5 | 61.5 | 60.5 | 59.0 | 13.5 | 1.03 | 333 | 420 |
| 9  | S5  | 0.5  | 4.4 | 63.5 | 62.5 | 61.5 | 15.0 | 1.07 | 324 | 424 |
| 10 | S6  | 0.5  | 4.4 | 61.5 | 60.5 | 60.5 | 14.0 | 1.03 | 337 | 432 |
| 11 | S7  | 0.5  | 4.5 | 61.0 | 61.5 | 60.5 | 14.5 | 1.04 | 329 | 435 |
| 12 | S8  | 0.5  | 4.6 | 61.5 | 60.5 | 59.5 | 13.5 | 1.04 | 312 | 416 |
| 13 | S9  | 0.5  | 4.5 | 63.5 | 62.5 | 62.0 | 16.0 | 1.03 | 345 | 434 |
| 14 | S10 | 0.5  | 4.5 | 62.5 | 61.5 | 61.0 | 15.5 | 1.02 | 332 | 439 |
| 15 | S11 | 0.5  | 4.4 | 61.0 | 61.0 | 59.5 | 14.5 | 1.04 | 325 | 420 |

*Addition amount of cement admixture: % by weight of polymer solids content to cement.

TABLE 4-2

Results of Property Tests (Comparative Examples)

| | Cement Admixture | | Amount of Air (%) | Slump Flow (cm) | | | Self Packing Property (Packing Height) (cm) | Resistance to Segregation (Inner-to-Outer ratio) (cm) | Comprehensive Strength (kg/cm²) | |
|---|---|---|---|---|---|---|---|---|---|---|
| Ex. No. | Name | Amount (wt %)* | | Immediately After | After 60 min. | After 120 min. | | | Age 7 days | Age 28 days |
| 16 | R1  | 0.25   | 3.5 | 57.5 | 55.0 | 51.5 | 8.5  | 1.26 | 264 | 346 |
| 17 | R1  | 0.5    | 4.6 | 61.5 | 58.0 | 57.5 | 12.0 | 1.22 | 277 | 353 |
| 18 | R1  | 0.75   | 4.9 | 62.0 | 60.5 | 58.0 | 14.0 | 1.30 | 245 | 339 |
| 19 | R2  | 0.25   | 3.7 | 58.5 | 56.5 | 52.0 | 9.0  | 1.31 | 259 | 338 |
| 20 | R2  | 0.5    | 4.7 | 62.5 | 60.0 | 57.5 | 12.5 | 1.27 | 263 | 347 |
| 21 | R2  | 0.75   | 4.9 | 62.0 | 61.5 | 58.5 | 14.5 | 1.33 | 241 | 335 |
| 22 | R3  | 0.5    | 4.4 | 60.5 | 59.5 | 57.5 | 13.0 | 1.29 | 272 | 381 |
| 23 | R4  | 0.5    | 4.4 | 61.0 | 59.0 | 57.0 | 12.5 | 1.20 | 256 | 349 |
| 24 | R5  | 0.5    | 4.5 | 62.5 | 60.0 | 58.0 | 12.0 | 1.28 | 236 | 333 |
| 25 | R6  | 0.5    | 4.6 | 59.5 | 56.5 | 55.0 | 9.5  | 1.22 | 294 | 380 |
| 26 | R7  | 0.5    | 4.5 | 59.0 | 56.5 | 54.5 | 11.0 | 1.27 | 247 | 353 |
| 27 | R8  | 0.5    | 4.6 | 60.5 | 60.0 | 57.0 | 11.5 | 1.26 | 240 | 348 |
| 28 | SP1 | 0.5**  | 4.6 | 63.5 | 64.0 | 58.5 | 10.5 | 1.29 | 246 | 337 |
| 29 | SP2 | 0.5**  | 4.4 | 61.5 | 60.0 | 57.5 | 11.0 | 1.26 | 260 | 348 |
| 30 | SP1 | 0.5    | 5.0 | 56.5 | 55.5 | 52.0 | 8.5  | 1.07 | 283 | 352 |
| 31 | SP2 | 0.5    | 4.9 | 56.5 | 54.0 | 49.0 | 8.0  | 1.06 | 278 | 360 |

*Addition amount of cement admixture: % by weight of polymer solids content to cement.
**In Comparative Examples 28 and 29, methyl cellulose was used in an amount of 400 g/m³ in combination.

(2) Performance Test-2 for Cement Admixture

Each synthesized polymer was added upon preparation of concrete, and performance evaluation tests on flowability, flowability maintenance property and compressive strength were practiced.

(2-1) Concrete Formulation and Mixing Method

Material formulation of concrete in performance evaluation test is shown in Table 5.

TABLE 5

| Concrete Material Formulation | | | | | |
|---|---|---|---|---|---|
| W/C (%) | S/a (%) | Unit Amount (kg/m³) | | | |
| | | W[1] | C[2] | S[3] | G[4] |
| 50.0 | 46.0 | 165 | 330 | 830 | 970 |

[1] Water (W): City water
[2] Cement (C): Normal Portland cement (specific gravity: 3.16)
[3] Fine aggregate (S): Fuji River sand (specific gravity: 2.60, coarse grain ratio: 2.65)
[4] Coarse aggregate (G): Crushed stone produced in Ohme (specific gravity: 2.65, coarse grain ratio: 6.85)
*a = S + G (ii) Kneading Method This was performed in the same manner as in "Performance Evaluation Test-1 for cement admixture."

(2-2) Performance Test Method

Slump Test: In accordance with the US standard ANSI/ASTM C 143-78 (Standard Test for Slump of Portland Cement Concrete), a slump cone (inner diameter of upper end: 10 cm, inner diameter of lower end: 20 cm, height: 30 cm) placed on a water-tight plate was packed with concrete and the surface of the concrete was made flush with the upper edge of the slump cone. Then, the slump cone was gently drawn up vertically and a decrease in height (cm) of the concrete in the central part was measured. This test was performed on the slump cone immediately after the packing and after 60 minutes from the packing.

Air amount and compressive strength (after 7 days and 28 days) were measured in the same manner as in "Performance Evaluation Test-1 for cement admixture."

(2-3) Performance Test Results

Performance test results obtained are shown in Table 6.

TABLE 6

|  |  | Cement |  | Slump (cm) |  | Compressive Strength |  |
|---|---|---|---|---|---|---|---|
|  |  | Admixture | Amount | Immedi- |  | (kg/cm$^2$) |  |
|  | No. | Name | Amount (wt %) | of Air (%) | ately After | After 60 min. | Age 7 days | Age 28 days |
| Ex. | 1 | S1 | 0.25 | 4.5 | 20.8 | 18.5 | 175 | 324 |
|  | 2 | S2 | 0.25 | 4.6 | 21.5 | 20.0 | 169 | 335 |
|  | 3 | S3 | 0.25 | 4.6 | 19.8 | 18.8 | 153 | 333 |
|  | 4 | S4 | 0.25 | 4.5 | 21.1 | 19.3 | 185 | 341 |
|  | 5 | S5 | 0.25 | 4.4 | 20.4 | 18.4 | 168 | 322 |
|  | 6 | S6 | 0.25 | 4.4 | 20.3 | 19.2 | 164 | 330 |
|  | 7 | S7 | 0.25 | 4.4 | 20.6 | 19.3 | 170 | 336 |
|  | 8 | S8 | 0.25 | 4.7 | 19.7 | 18.2 | 153 | 324 |
|  | 9 | S9 | 0.25 | 4.5 | 20.0 | 18.8 | 172 | 335 |
|  | 10 | S10 | 0.25 | 4.6 | 20.4 | 19.4 | 164 | 320 |
|  | 11 | S11 | 0.25 | 4.5 | 19.7 | 18.6 | 157 | 323 |
| Comp. Ex. | 16 | R1 | 0.25 | 4.5 | 20.4 | 15.0 | 135 | 289 |
|  | 17 | R2 | 0.25 | 4.5 | 20.8 | 15.8 | 129 | 281 |
|  | 18 | R3 | 0.25 | 4.3 | 21.2 | 15.4 | 131 | 273 |
|  | 19 | R4 | 0.25 | 4.7 | 20.6 | 14.4 | 126 | 282 |
|  | 20 | R5 | 0.25 | 4.5 | 21.3 | 13.7 | 129 | 284 |
|  | 21 | R6 | 0.25 | 4.2 | 17.8 | 9.6 | 110 | 249 |
|  | 22 | R7 | 0.25 | 4.3 | 18.1 | 11.0 | 114 | 268 |
|  | 23 | R8 | 0.25 | 4.3 | 19.7 | 13.8 | 125 | 267 |
|  | 24 | SP1 | 0.25 | 4.4 | 21.2 | 16.2 | 138 | 288 |
|  | 25 | SP2 | 0.25 | 4.3 | 20.7 | 15.9 | 140 | 286 |

**Addition amount of cement admixture: % by weight of polymer solids content to cement.

Industrial Applicability

The cement admixture of the present invention can impart fresh concrete with flowability, flowability retaining property, packing property, resistance to segregation in good balance by simply mixing it with cement compositions such as concrete and is effective in improvement of executability, operability and the quality of hardened article.

What is claimed is:

1. A cement admixture comprising a copolymer obtained by polymerizing a monomer mixture comprising:

(A) 2 to 85% by weight of a monomer represented by general formula (1)

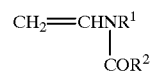

(wherein, $R^1$ and $R^2$, which are the same or different, each represent a hydrogen atom or a methyl group), (B) 90 to 10% by weight of one or more monomers represented by general formula (2)

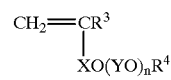

(wherein $R^3$ represents a hydrogen atom or a methyl group, X represents —C(=O)— or —CH$_2$—, Y represents an alkylene group having 2 to 4 carbon atoms, $R^4$ represents a hydrogen atom or an alkyl group having 1 to 5 carbon atoms, and n is an integer of from 2 to 100), and (C) 5 to 50% by weight of a vinyl monomer containing a carboxylic acid group, or a salt of a carboxylic acid group; or a sulfonic acid group, or a salt of a sulfonic acid group, wherein the sum of the monomers (A), (B) and (C) is 100% by weight.

2. A cement admixture comprising a copolymer obtained by polymerizing a monomer mixture comprising:

(A) 2 to 85% by weight of a monomer represented by general formula (1)

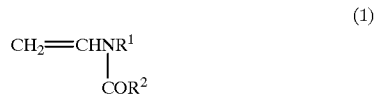

(1)

$$CH_2=CHNR^1$$
$$|$$
$$COR^2$$

(wherein, $R^1$ and $R^2$, which are the same or different, each represent a hydrogen atom or a methyl group), (B) 90 to 10% by weight of one or more monomers represented by general formula (2)

(2)

$$CH_2=CR^3$$
$$|$$
$$XO(YO)_nR^4$$

(wherein $R^3$ represents a hydrogen atom or a methyl group, X represents —C(=O)— or —CH$_2$—, Y represents an alkylene group having 2 to 4 carbon atoms, $R^4$ represents a hydrogen atom or an alkyl group having 1 to 5 carbon atoms, and n is an integer of from 2 to 100), (C) 5 to 50% by weight of a vinyl monomer containing, a carboxylic acid group, or a salt of a carboxylic acid group; or a sulfonic acid group, or a salt of a sulfonic acid group and (D) 0 to 40% by weight of a vinyl monomer other than the monomers (A), (B) and (C), wherein the sum of the monomers (A), (B), (C) and (D) is 100% by weight.

3. The cement admixture as claimed in claim 1 or 2, wherein the monomer (A) represented by the general formula (1) is N-vinylacetamide.

4. The cement admixture as claimed in claim 1 or 2, wherein the monomer (B) represented by the general formula (2) is one in which n is an integer of from 4 to 50.

5. The cement admixture as claimed in claim 1 or 2, wherein the monomer (B) represented by the general formula (2) is one in which n is an integer of from 4 to 25, X is —C(=O)—, Y is —CH$_2$—CH$_2$—O—, and $R^4$ is a methyl group.

6. The cement admixture as claimed in claim 1 or 2, wherein the vinyl monomer containing one carboxylic acid group, at least one sulfonic acid group or salt thereof in a molecule (C) is one or more compounds selected from the group consisting of (meth)acrylic acid, (meth)allylsulfonic acid, and salts thereof.

7. The cement admixture as claimed in claim 6, wherein the vinyl monomer containing a carboxylic acid group, or a salt of a carboxylic acid group; or a sulfonic acid group, or a salt of a sulfonic acid group (C) is (meth)acrylic acid.

8. The cement admixture as claimed in claim 2, wherein the vinyl monomer (D) is one or more compounds selected from the group consisting of methyl (meth)acrylate, ethyl (meth)acrylate, 2-hydroxylethyl (meth)acrylate, 2-hydroxypropyl (meth)acrylate, and (meth)acrylonitrile.

9. A cement composition comprising a cement admixture imparted with resistance to segregation, wherein said cement admixture comprises a copolymer obtained by polymerizing a monomer mixture comprising:

(A) 2 to 85% by weight of a monomer represented by general formula (1)

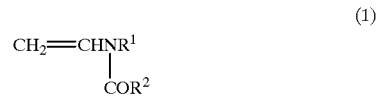

(1)

$$CH_2=CHNR^1$$
$$|$$
$$COR^2$$

wherein, $R^1$ and $R^2$, which may be the same or different, each represent a hydrogen atom or a methyl group, (B) 90 to 10% by weight of one or more monomers represented by general formula (2)

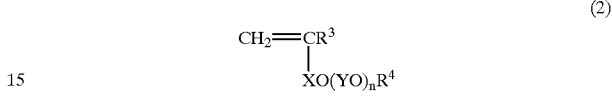

(2)

$$CH_2=CR^3$$
$$|$$
$$XO(YO)_nR^4$$

wherein $R^3$ represents a hydrogen atom or a methyl group, X represents —C(=O)— or —CH$_2$—, Y represents an alkylene group having 2 to 4 carbon atoms, $R^4$ represents a hydrogen atom or an alkyl group having 1 to 5 carbon atoms, and n is an integer of from 2 to 100, and (C) 5 to 50% by weight of a vinyl monomer containing a carboxylic acid group, or a salt of a carboxylic acid group; or a sulfonic acid group, or a salt of a sulfonic acid group, wherein the sum of monomers (A), (B) and (C) is 100% by weight.

10. A cement composition comprising a cement admixture imparted with resistance to segregation, wherein said cement admixture comprises a copolymer obtained by polymerizing a monomer mixture comprising:

(A) 2 to 85% by weight of a monomer represented by general formula (1)

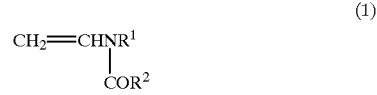

(1)

$$CH_2=CHNR^1$$
$$|$$
$$COR^2$$

wherein, $R^1$ and $R^2$, which may be the same or different, each represent a hydrogen atom or a methyl group, (B) 90 to 10% by weight of one or more monomers represented by general formula (2)

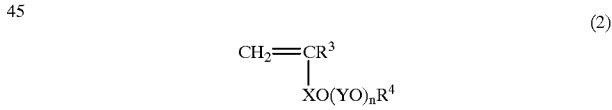

(2)

$$CH_2=CR^3$$
$$|$$
$$XO(YO)_nR^4$$

wherein $R^3$ represents a hydrogen atom or a methyl group, X represents —C(=O)— or —CH$_2$—, Y represents an alkylene group having 2 to 4 carbon atoms, $R^4$ represents a hydrogen atom or an alkyl group having 1 to 5 carbon atoms, and n is an integer of from 2 to 100, (C) 5 to 50% by weight of a vinyl monomer containing a carboxylic acid group, or a salt of a carboxylic acid group; or a sulfonic acid group, or a salt of a sulfonic acid group, and (D) 0 to 40% by weight of a vinyl monomer other than monomers (A), (B) and (C), wherein the sum of monomers (A), (B), (C) and (D) is 100% by weight.

11. A cement composition comprising a cement admixture imparted with resistance to segregation, wherein said cement admixture comprises a copolymer obtained by polymerizing a monomer mixture comprising:

(A) 2 to 85% by weight of a monomer represented by general formula (1)

(1)

wherein, $R^1$ and $R^2$, which may be the same or different, each represent a hydrogen atom or a methyl group,
(B) 90 to 10% by weight of one or more monomers represented by general formula (2)

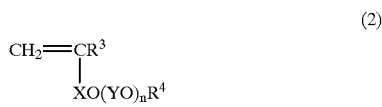

(2)

wherein $R^3$ represents a hydrogen atom or a methyl group, X represents —C(=O)— or —$CH_2$—, Y represents an alkylene group having 2 to 4 carbon atoms, $R^4$ represents a hydrogen atom or an alkyl group having 1 to 5 carbon atoms, and n is an integer of from 2 to 100, and
(C) 5 to 50% by weight of a vinyl monomer containing a carboxylic acid group, or a salt of a carboxylic acid group; or a sulfonic acid group, or a salt of a sulfonic acid group, wherein the sum of monomers (A), (B) and (C) is 100% by weight.

12. A cement composition comprising a cement admixture imparted with resistance to segregation, wherein said cement admixture comprises a copolymer obtained by polymerizing a monomer mixture comprising:
(A) 2 to 85% by weight of a monomer represented by general formula (1)

(1)

wherein, $R^1$ and $R^2$, which may be the same or different, each represent a hydrogen atom or a methyl group,
(B) 90 to 10% by weight of one or more monomers represented by general formula (2)

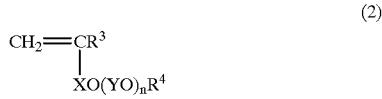

(2)

wherein $R^3$ represents a hydrogen atom or a methyl group, X represents —C(=O)— or —$CH_2$—, Y represents an alkylene group having 2 to 4 carbon atoms, $R^4$ represents a hydrogen atom or an alkyl group having 1 to 5 carbon atoms, and n is an integer of from 2 to 100,
(C) 5 to 50% by weight of a vinyl monomer containing a carboxylic acid group, or a salt of a carboxylic acid group; or a sulfonic acid group, or a salt of a sulfonic acid group, and
(D) 0 to 40% by weight of a vinyl monomer other than monomers (A), (B) and (C),
wherein the sum of monomers (A), (B), (C) and (D) is 100% by weight.

13. The cement composition as claimed in claim 9 or 10, wherein the monomer (B) represented by the general formula (2) is one in which n is an integer of from 4 to 25, X is —C(=O)—, Y is —$CH_2$—$CH_2$—O—, and $R^4$ is a methyl group.

14. The cement composition as claimed in claim 9 or 10, wherein the vinyl monomer (C) is one or more compounds selected from the group consisting of (meth)acrylic acid, (meth)allylsulfonic acid, and salts thereof.

15. The cement composition as claimed in claim 14, wherein the vinyl monomer (C) is (meth) acrylic acid.

16. The cement composition as claimed in claim 10, wherein the vinyl monomer (D) is one or more compounds selected from the group consisting of methyl (meth)acrylate, ethyl (meth)acrylate, 2-hydroxyethyl (meth)acrylate, 2-hydroxypropyl (meth)acrylate, and (meth)acrylonitrile.

17. A cement composition comprising a cement admixture imparted with resistance to segregation, wherein said cement admixture comprises a copolymer obtained by polymerizing a monomer mixture comprising:
(A) 2 to 85% by weight of a monomer represented by general formula (1)

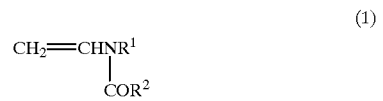

(1)

wherein, $R^1$ and $R^2$, which may be the same or different, each represent a hydrogen atom or a methyl group,
(B) 90 to 10% by weight of one or more monomers represented by general formula (2)

(2)

wherein $R^3$ represents a hydrogen atom or a methyl group, X represents —C(=O)— or —$CH_2$—, Y represents an alkylene group having 2 to 4 carbon atoms, $R^4$ represents a hydrogen atom or an alkyl group having 1 to 5 carbon atoms, and n is an integer of from 2 to 100, and
(C) 5 to 50% by weight of a vinyl monomer containing a carboxylic acid group, or a salt of a carboxylic acid group; or a sulfonic acid group, or a salt of a sulfonic acid group,
wherein the sum of monomers (A), (B) and (C) is 100% by weight, and
wherein the cement admixture imparted with resistance to segregation comprises a solids content of 0.1 to 2.0% by weight based on a cement and a hydraulic substance.

18. A cement composition comprising a cement admixture imparted with resistance to segregation, wherein said cement admixture comprises a copolymer obtained by polymerizing a monomer mixture comprising:
(A) 2 to 85% by weight of a monomer represented by general formula (1)

(1)

wherein, $R^1$ and $R^2$, which may be the same or different, each represent a hydrogen atom or a methyl group,
(B) 90 to 10% by weight of one or more monomers represented by general formula (2)

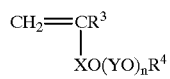

wherein $R^3$ represents a hydrogen atom or a methyl group, X represents —C(=O)— or —CH$_2$—, Y represents an alkylene group having 2 to 4 carbon atoms, $R^4$ represents a hydrogen atom or an alkyl group having 1 to 5 carbon atoms, and n is an integer of from 2 to 100, (C) 5 to 50% by weight of a vinyl monomer containing a carboxylic acid group, or a salt of a carboxylic acid group; or a sulfonic acid group, or a salt of a sulfonic acid group, and (D) 0 to 40% by weight of a vinyl monomer other than monomers (A), (B) and (C), wherein the sum of monomers (A), (B), (C) and (D) is 100% by weight, and wherein the cement admixture imparted with resistance to segregation comprises a solids content of 0.1 to 2.0% by weight based on a cement and a hydraulic substance.

19. A cement composition comprising a cement admixture imparted with resistance to segregation, wherein said cement admixture comprises a copolymer obtained by polymerizing a monomer mixture comprising:

(A) 2 to 85% by weight of a monomer represented by general formula (1)

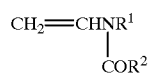

wherein, $R^1$ and $R^2$, which may be the same or different, each represent a hydrogen atom or a methyl group, (B) 90 to 10% by weight of one or more monomers represented by general formula (2)

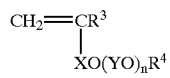

wherein $R^3$ represents a hydrogen atom or a methyl group, X represents —C(=O)— or —CH$_2$—, Y represents an alkylene group having 2 to 4 carbon atoms, $R^4$ represents a hydrogen atom or an alkyl group having 1 to 5 carbon atoms, and n is an integer of from 2 to 100, and (C) 5 to 50% by weight of a vinyl monomer containing a carboxylic acid group, or a salt of a carboxylic acid group; or a sulfonic acid group, or a salt of a sulfonic acid group, wherein the sum of monomers (A), (B) and (C) is 100% by weight, and wherein the cement admixture imparted with resistance to segregation comprises a solids content of 0.1 to 2.0% by weight based on a cement and a hydraulic substance.

20. A cement composition comprising a cement admixture imparted with resistance to segregation, wherein said cement admixture comprises a copolymer obtained by polymerizing a monomer mixture comprising:

(A) 2 to 85% by weight of a monomer represented by general formula (1)

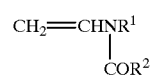

wherein, $R^1$ and $R^2$, which may be the same or different, each represent a hydrogen atom or a methyl group, (B) 90 to 10% by weight of one or more monomers represented by general formula (2)

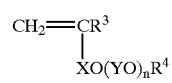

wherein $R^3$ represents a hydrogen atom or a methyl group, X represents —C(=O)— or —CH$_2$—, Y represents an alkylene group having 2 to 4 carbon atoms, $R^4$ represents a hydrogen atom or an alkyl group having 1 to 5 carbon atoms, and n is an integer of from 2 to 100, (C) 5 to 50% by weight of a vinyl monomer containing a carboxylic acid group, or a salt of a carboxylic acid group; or a sulfonic acid soup, or a salt of a sulfonic acid group, and (D) 0 to 40% by weight of a vinyl monomer other than monomers (A), (B) and (C), wherein the sum of monomers (A), (B), (C) and (D) is 100% by weight, and wherein the cement admixture imparted with resistance to segregation comprises a solids content of 0.1 to 2.0% by weight based on a cement and a hydraulic substance.

21. The cement composition as claimed in claim 17 or 18, wherein the monomer (B) represented by the general formula (2) is one in which n is an integer of from 4 to 25, X is —C(=O)—, Y is —CH$_2$—CH$_2$—O—, and $R^4$ is a methyl group.

22. The cement composition as claimed in claim 17 or 18, wherein the vinyl monomer (C) is one or more compounds selected from the group consisting of (meth)acrylic acid, (meth)allylsulfonic acid, and salts thereof.

23. The cement composition as claimed in claim 22, wherein the vinyl monomer (C) is (meth)acrylic acid.

24. The cement composition as claimed in claim 18, wherein the vinyl monomer (D) is one or more compounds selected from the group consisting of methyl (meth)acrylate, ethyl (meth)acrylate, 2-hydroxylethyl (meth)acrylate, 2-hydroxypropyl (meth)acrylate, and (meth)acrylonitrile.

* * * * *